US005385076A

United States Patent [19]

Belli

[11] Patent Number: 5,385,076

[45] Date of Patent: Jan. 31, 1995

[54] REINFORCED DRUMHEAD

[75] Inventor: Remo D. Belli, North Hollywood, Calif.

[73] Assignee: Remo, Inc., North Hollywood, Calif.

[21] Appl. No.: 262,580

[22] Filed: Jun. 20, 1994

[51] Int. Cl.[6] G01D 13/02

[52] U.S. Cl. 84/414

[58] Field of Search 84/411 R, 411 P, 414, 84/452 R

[56] References Cited

U.S. PATENT DOCUMENTS 2,934,989 5/1960 Belli 84/414
3,272,057 9/1966 Saito 84/414
3,668,296 6/1972 Criscuolo 84/414
4,362,081 12/1982 Hartry 84/414

*Primary Examiner*—Michael L. Gellner
*Assistant Examiner*—Patrick J. Stanzione
*Attorney, Agent, or Firm*—Rapkin, Gitlin & Moser

[57] ABSTRACT

A drumhead and a method for construction of a drumhead that can easily be installed and removed from most kinds of instrument shells, particularly congas, and also can be employed with the shell without the usual requirement of a standard rim mounted counter-hoop. The drumhead comprises a multi-laminate drumming surface, an oblique oriented multi-laminate circumferential sidewall integrally formed with and disposed around the periphery of the drumming surface and a reinforced counter-hoop supporting shoulder component abutting the lower section of the sidewall. The annular shoulder, which is formed from a hardened liquid resin material, is reinforced with a ring or hoop-like metal shank, which is introduced into the liquid resin before the liquid cures. An improved method of construction of the drumhead of the present invention comprising generally a method of producing the drumhead from a multi-laminate material, forming the drumhead surface and then shaping the sidewalls in a direction generally oblique relative to the plane of the drumhead surface and using a cured liquid resin to form a reinforced annular shoulder in abutting relation with the sidewall.

14 Claims, 2 Drawing Sheets

REINFORCED DRUMHEAD

BACKGROUND OF THE INVENTION

1. Field of the Invention

The present invention relates to the field of drums and drumheads and, more particularly to a drumhead and a method for constructing a drumhead that is installable on a conga, bongo or any standard drum shell utilizing a tensioning hoop upon a reinforced annular shoulder and also is employable as a single-headed hand-held instrument.

2. Description of the Prior Art

Drumheads used in combination with various types of drumshells have long been known in the prior art. Examples are heads which range from the relatively crude and unsophisticated precursors to the modern day versions, such as those that use an animal skin stretched over the opening at one end of a drum shell, to the more sophisticated and conventional, such as those which employ one of the many synthetic materials from which contemporary pretuned and non-pretuned drumheads are fashioned.

Congas and bongos, in contrast to the more familiar and omnipresent tom-toms, snare and bass drums, enlist a unique head construction and tensioning mechanism that are designed to accommodate their special method of play. Using the conga drum as an example, the head is constructed by first creating a flesh hoop. The hoop is formed by wrapping an animal skin or some other suitable material around the edges of a large ring and securing the skin to the ring by tucking it under the ring or by using any other appropriate means of attachment. The flesh hoop is then stretched over the opening at the top of the conga drum shell, which is traditionally barrel-shape, and secured and tensioned there with a counter-hoop in combination with any suitable tensioning mechanism. Alternatively, the animal skin or some other suitable material can simply be stretched over the top end of the conga drum shell and then nailed in place with a series of tacks that are evenly distributed around the side of the shell.

Years ago, counter-hoops for the conga drum were typically fashioned from relatively crude materials that might have included a bendable tree branch, a braided or twisted rope or some similar item used for this purpose. Modern day versions of the counter-hoop are generally made of metal or occasionally a hard plastic material that is capable of withstanding the rigors and stress attendant to the tensioning process.

The proper installation of a counter-hoop on a typical conga drum is fairly straight forward. The hoop is first brought down over the top of the drumhead until it eventually comes to rest upon the counter-hoop support component of the flesh hoop. There, using older and more traditional means, such as, for example, any rope-like material, intertwisted strands of fibre or leather cord, to connect the counter-hoop to the drum shell, the counter-hoop is drawn tightly downward to stretch the flesh hoop and, thus, create a taut head to serve as the striking surface for the drum. Appropriate adjustments will then tension the head to achieve the desired tonality.

Conventional drums, such as tom-toms, snare drums and bass drums, naturally also employ a counter-hoop. In this instance, the counter-hoop is mounted upon a flesh hoop, which is conceptually similar to the congas, in either of two ways, to wit: (1) upon the rim or bearing edge of the head where it projects slightly above the head surface or (2) a half inch or so below the drumhead, using any suitable clamping mechanism to ensure that the head is properly tensioned and tuned. The standard modern day counter-hoop is typically comprised of metal and is round in shape to conform to the shape and specification of the support component, i.e. the bearing edge of the head or the flesh hoop. The counter-hoop is usually fastened to the shell using a series of lugs tightly affixed and spread evenly around the exterior surface of the shell. A corresponding series of rods connected at one end to the counter-hoop and to a mating lug at the other end are rotated to a prescribed tightness until the drumhead is appropriately tensioned and tuned to the proper tonality.

The evolution of certain of the more important elements of the modern day drumhead, particularly the pre-tuned version, begins with the traditional counter-hoop, which is tightly secured to the rim or bearing edge of the drumhead. The flesh component of the head constitutes a multi-laminate material with a conventional striking surface and a contiguous circumferential sidewall formed from the same multi-laminate material in a series of strips of relatively equal length and width. The head is tensioned using any of the several suitable mechanisms provided for this purpose. In order for the laminated flesh component of the head to maintain its pre-tuned character and, thus, the proper tension and desired tonality, an annular structure is provided in abutting relation with the flesh component of the head inside the head cavity. There the structure forms a sturdy and resilient frame for supporting the flesh component and maintaining it in a taut condition. The series of strips that comprise the sidewall are typically secured to the outside surface of the support frame with staples or some other suitable device used for this purpose. This support frame, which is similar, if not identical, in composition to the material comprising the larger drumshell component, helps substantially in sustaining the proper tension in the head, most particularly the striking surface. The frame prevents the laminated materials that comprise the head from distorting and crushing under the stress of the repeated poundings of the hands or drumsticks and, of course, the tensioning process itself.

Along with the introduction of this relatively advanced technology came the addition of the flesh component in an improved form. Constructed as a separate piece around the bottom edge of the drumhead was an annular shoulder, which was attached to the sidewall of the head and projected out about a quarter of an inch or so from the sidewall for receiving and engaging the counter-hoop. The problem then encountered, however, concerned the tendency of the shoulder to separate from the sidewall, which normally occurred as a result of the relatively severe vertical tensioning forces pulling against the shoulder repeatedly during the tensioning process. In short, the connection between the shoulder and the sidewall failed, resulting in the head along the area of the interface between the two components coming apart literally "at the seams".

In an effort to remedy this problem, an improved version of the shoulder was formed from a resin material, which was die cast in a mold. The resin was left to harden or cure against the sidewall of the drumhead, where it formed the shoulder provided to support the counter-hoop or tensioning ring. To add more strength to the connection between the shoulder and the sidewall, holes were made at the end of each of the sidewall strips and spaced at regular intervals around the bottom edge of the sidewall. A portion of the liquid resin used to form the shoulder also penetrated these holes to enable the cured resin to act somewhat as an anchor to grip the sidewall and better resist the tendency of the shoulder and sidewall to separate.

Although a significant improvement over the prior art, there were still some drawbacks associated with this particular drumhead. One such drawback regarded the weakness that appeared to exist at the interface where the shoulder was attached to the sidewall. Over time, the combination of the tensioning forces and the constant pounding of the striking surface weakened even this juncture and caused the two to separate as before. Another problem area regarded the conventional barrel-shape conga shell, which has a slightly oblique shape at the top where the head is installed. In order to accommodate this design and also employ a pre-tuned drumhead with sidewalls and a shoulder that would successfully stand up to the rigors and stresses associated with the tensioning process and the repeated poundings of the striking surface, it became imperative to develop a head with different characteristics that would address both concerns. This included a sturdy circumferential drumhead sidewall having an oblique orientation to ensure not only a proper and snug fit with the shell, but also an appearance that was aesthetically correct when the two are mated. And, in lieu of the cumbersome and weighty frame support previously provided for strength, an added component, which combines a plurality of layered materials upon the flesh element and a perimeter shoulder reinforced with a circular shank, is provided to support the counter-hoop and better maintain the integrity of the drumhead.

Thus, it is desirable to provide a drumhead and a method for construction of a drumhead for use with all types of pre-tuned and non-pretuned drums, including tom-toms, snare, bass, conga and bongo drums, that can be played without the obstruction and inconvenience of a rim mounted counter-hoop. The drumhead includes the addition of an oblique oriented multi-laminate circumferential sidewall coupled around the bottom edge with a reinforced shoulder component provided to support the counter-hoop and better maintain the integrity of the head. And finally, the improved drumhead can easily and quickly be installed and removed from the drumshell for repair or replacement and also can be employed as a single-headed hand-held drum.

SUMMARY OF THE INVENTION

The present invention provides a drumhead and a method for construction of a drumhead that can easily be installed on and removed from most kinds of instrument shells, particularly congas, and also can be employed with the shell without the usual requirement of a standard rim mounted counter-hoop. The drumhead of the present invention is a convertible device which, because of its unique design and physical structure, is easily mounted and tensioned on a conga shell. It is also adaptable for use with any conventional drumshell and also, if desired, can be used and played independently as a single-headed hand-held drum. The drumhead is uniform in construction and comprises a multi-laminate drumming surface, an oblique oriented multi-laminate circumferential sidewall integrally formed with and disposed around the periphery of the drumming surface and a reinforced shoulder component abutting the lower section of the sidewall, which includes a seat portion along its top surface. The annular shoulder, which is formed from a hardened liquid resin material, is reinforced with a ring or hoop-like metal shank, which is introduced into the liquid resin before the liquid cures. The shank adds substantial strength to the shoulder to enable it to maintain the shoulder's integrity and withstand the constant tensioning forces that pull against it. The oblique sidewall is comprised of a plurality of individual strips separated by slit-like openings and a corresponding opening formed at the end of each strip. The sidewall and the integrally formed reinforced annular shoulder combine together as a unit. The invention is used in combination with a ring or modified version of a standard rim mounted counter-hoop, which is supported upon the seat of the reinforced annular shoulder. The hoop is attached by using any conventional tensioning mechanism, including, for example, the lug and rod combination normally used to secure the head to the instrument shell and tighten the head to achieve the desired tonality. The reinforced annular shoulder is securely anchored to the wall and is made to integrate with it by allowing the liquid resin used to form the shoulder to also penetrate the areas around and on both sides of the strips and through the openings. This ensures the integrity of the drumhead, and more specifically the integrity of the union between the sidewall and the shoulder. In this way, the shoulder will tightly grip the sidewall and, thus, will be made to withstand the stress forces that normally exist as a result of the repeated poundings upon the drumming surface and during tensioning. In the absence of an extremely strong bond between these two critical components and the contribution of a reinforced annular shoulder, the tension on the head will most certainly begin to fail and result in a dramatic loss of the proper tonality. The device will then become worthless as an instrument.

The apparatus of the present invention, because it employs an oblique oriented sidewall, is especially suitable for use with a conga drum, which is similarly designed at the top of the shell where the two components will mate. By eliminating the usual requirement of a rim mounted counter-hoop, the invention also provides a drumhead with an unobstructed rim. The invention also can be employed with all types of conventional drums, such as toms and snares, and hand-held single-headed drums, where the sidewall portion of the head is substantial enough in size and design, and the shoulder exists, to enable the musician to hold and play the drumhead independently of the shell. With the hand-held single-headed type of drum, the drumhead is held so that the striking surface faces to the side. The annular shoulder fits snugly inside the palm of the drummer's hand while the drummer's thumb rests firmly against the annular seat to ensure a firm and comfortable grip.

The invention also includes an improved method of construction of the drumhead of the present invention comprising generally a method of producing the drumhead from a multi-laminate material, forming the drumhead surface and then shaping the sidewalls in a direction generally oblique relative to the plane of the drumhead surface and using a cured liquid resin to form a reinforced annular shoulder in abutting relation with the sidewall.

Accordingly, it is an object of the present invention to provide an improved pre-tuned or non-pretuned drumhead having a circumferential sidewall with an orientation generally oblique to the horizontal plane of the drumming surface and a reinforced annular shoulder formed from a cured liquid resin that combine to enable the shoulder to securely grip the sidewall and prevent the two components from separating under the constant pounding of the drumming surface or when the head is tensioned.

It is a further object of the present invention to provide an improved pre-tuned or non-pretuned drumhead having a circumferential sidewall with an orientation generally oblique to the horizontal plane of the drumming surface and a counter-hoop supporting annular shoulder formed from a cured liquid resin and employing within a hoop-like shank, which is provided to give added strength to the shoulder and ensure the overall integrity of the drumhead under the stress of tensioning and the constant pounding of the drumming surface.

It is yet another object of the present invention to provide an improved pre-tuned or non-pretuned drumhead having an oblique oriented circumferential sidewall and a reinforced annular shoulder for grasping and holding the drumhead independently of the instrument shell as a single-headed drum in lieu of its use only as the striking surface of a more elaborate instrument shell.

It is yet another object of the present invention to provide an improved pre-tuned or non-pretuned drumhead that eliminates the usual requirement of a standard rim mounted counter-hoop and is interchangeably adaptable for use with conga, bongo and conventional drumshells.

It is still yet another object of the present invention to provide an improved pre-tuned or non-pretuned drumhead that is easy and cost effective to manufacture.

It is still yet another object of the present invention to provide an improved method of construction of the drumhead of the present invention.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
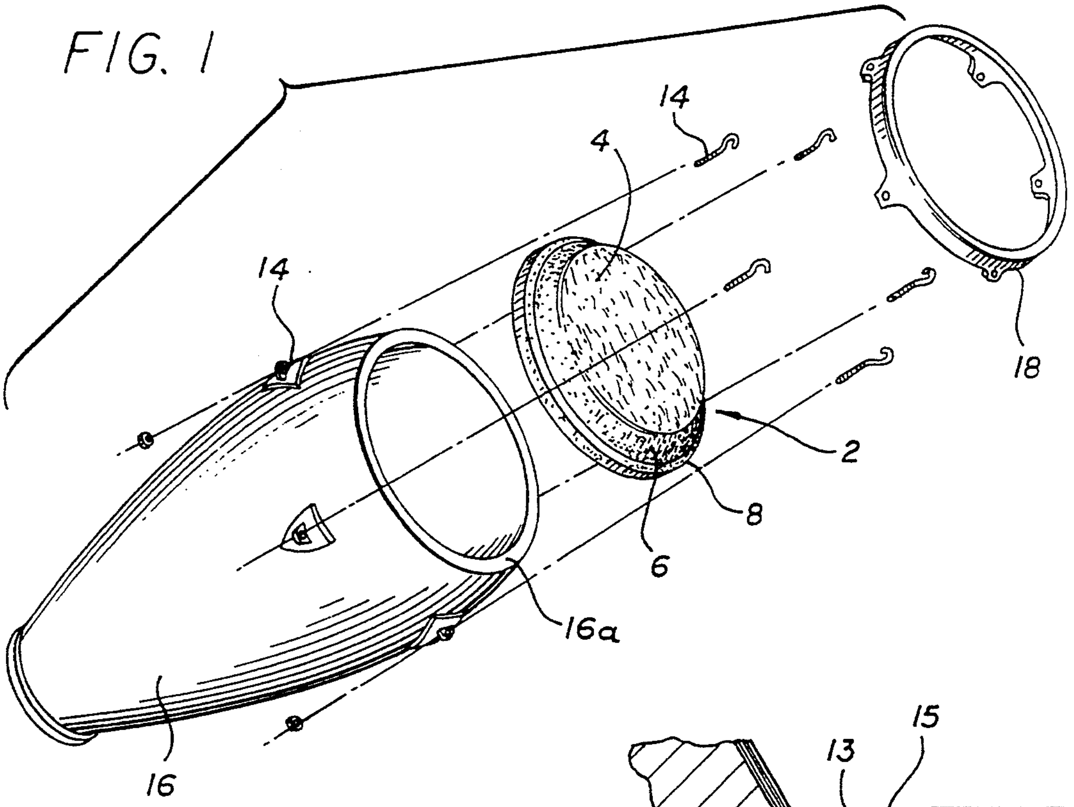
FIG. 1 is an exploded view of a drum assembly with the drumhead of the present invention shown in relation to the tensioning mechanism and the instrument shell.
Figure 3:
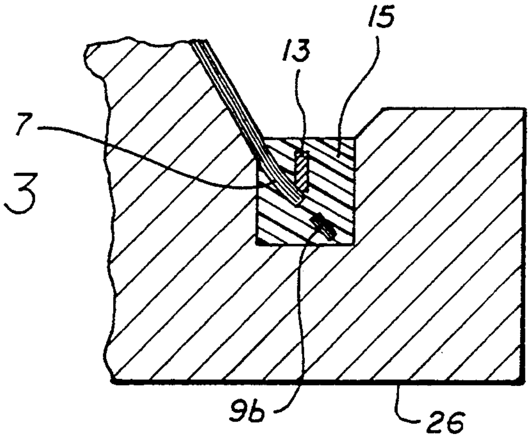
FIG. 3 is a partially fragmentary perspective view of the present invention showing the bottom section of the drumhead sidewall and the annular metal shank emersed in the resin filled die cast mold.
Figure 2:
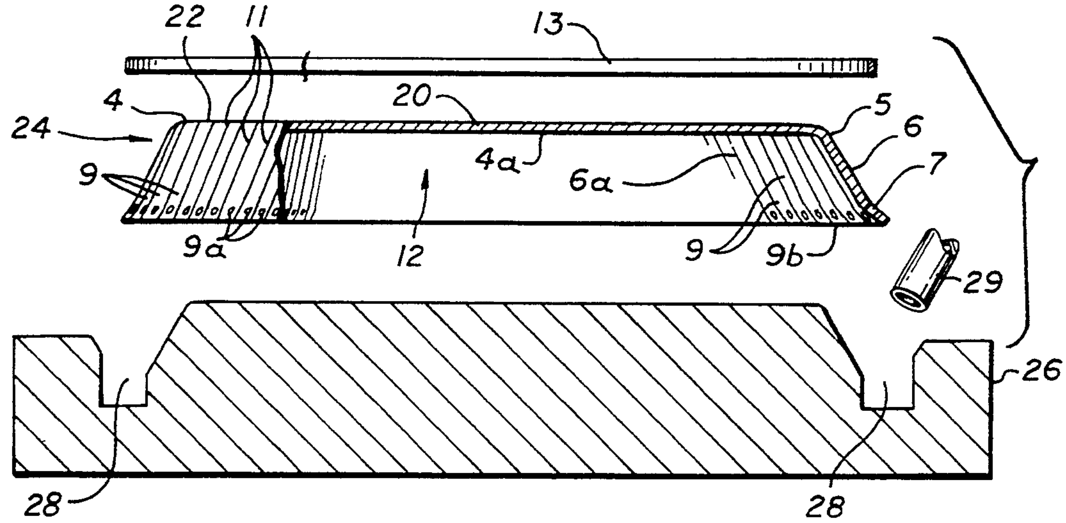
FIG. 2 is a partially exploded, partially fragmentary perspective view of the drumhead of the present invention just prior to the immersion of the drumhead and the shank into the liquid resin about to be introduced into the die cast mold, which is employed to form the annular shoulder.
Figure 4:
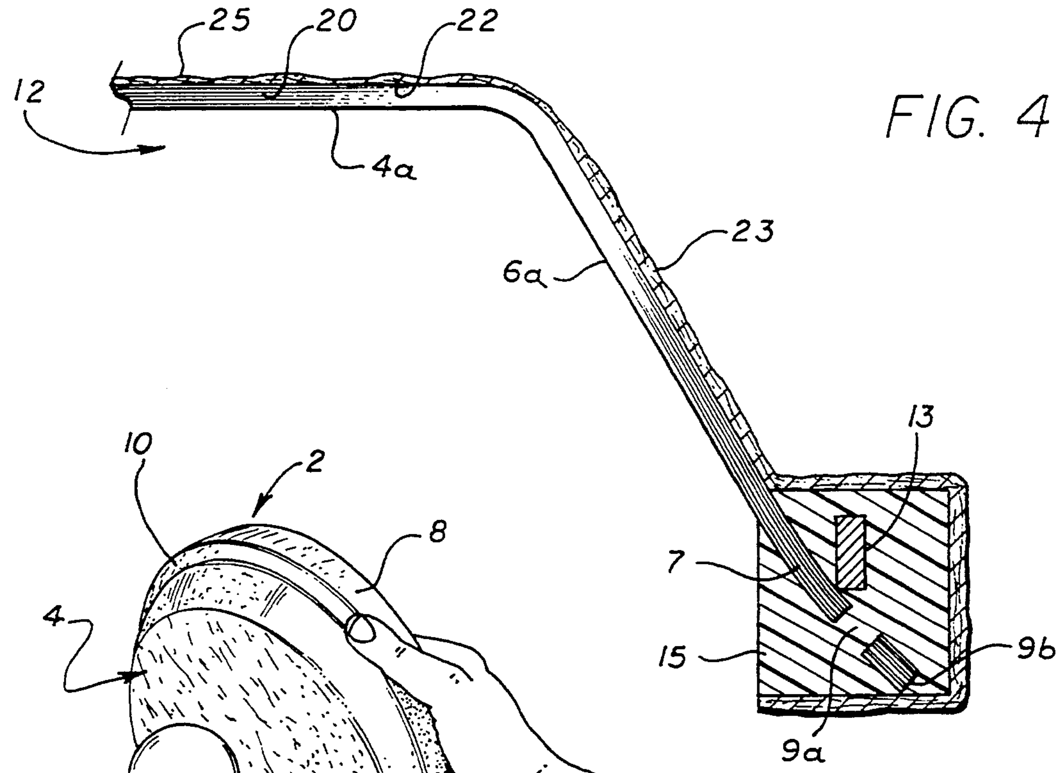
FIG. 4 is a partially fragmentary, cross-sectional view of the present invention showing the annular shoulder employing the reinforcing metal shank within.

FIG. 1 depicts a perspective view of the improved drumhead of the present invention designated generally as 2. Drumhead 2, which may either be pre-tuned or non-pretuned, is comprised of a striking surface 4 and a peripheral sidewall 6 formed integrally therewith. Annular shoulder 8 is formed integrally with the peripheral sidewall 6. Shoulder 8 includes an annular seat 10, which projects outwardly from the peripheral sidewall 6. A cavity 12, which is formed beneath the striking surface 4, is defined by the inner surface 4*a* and the inner sidewall 6*a*.

The peripheral sidewall 6 is adapted to be bent in a downward direction with an orientation generally oblique relative to the horizontal plane 2*a* of the striking surface 4. Formed from the material comprising the peripheral sidewall 6 are a plurality of individual strips 9. Each strip 9, which is approximately two inches in length and one-third of an inch in width, includes a corresponding opening 9*a* formed at one end.

The annular shoulder 8 is formed from a cured liquid resin 15 made from any suitable synthetic compound. The resin 15 is also made to flow within the spaces 11, which are formed between the individual strips 9, and inside the openings 9*a*. Before the resin 15 hardens, a ring or hoop-like shank 13, which may be fashioned from any suitable metal or hard plastic, is introduced around the bottom periphery 7 of the peripheral sidewall 6. The shank 13 gives substantial added strength to the annular shoulder 8 ensuring the integrity of the drumhead 2 under the stress of the tensioning and the constant pounding of the striking surface 4. The cured resin 15 penetrates the spaces 11 between the strips 9 and the openings 9*a* and encases the ends 9*b* of each of the strips 9 to ensure the integrity of the connection between the annular shoulder 8 and the peripheral sidewall 6. The combination of the two, namely the employment of the shank 13 together with the enveloping shoulder forming resin 15, will enable the shoulder 8 to tightly grip the peripheral sidewall 6 and form a secure union between the two. This results in maintaining the shape and integrity of the head 2, particularly the design and uniformity of the sidewall 6, and also prevents the shoulder 8 and sidewall 6 from easily separating, which would otherwise likely result from the stress forces caused by the regular tensioning of the instrument and the constant pounding upon the striking surface 4. In the absence of the strong bond existing between the reinforced annular shoulder 8 and the peripheral sidewall 6, the tension in the head would begin to ease and result in a dramatic, if not total, loss of proper tonality.

In a typical application of the present invention, head 2 is placed over the top 16*a* of a conga drum shell 16 and secured there. A counter-hoop 18 made of metal or some other suitably hard material is guided over the striking surface 4 and around the sidewall 6 until it rests evenly and firmly on the annular seat 10. Using any suitable clamping or tensioning mechanism 14, such as a lug-claw hook or lug-clamp combination, the hoop 18 is engaged and the head 2 is secured to the shell 16. The tensioning mechanism is then adjusted to tune the head 2 to the desired tonality.

Figure 5:
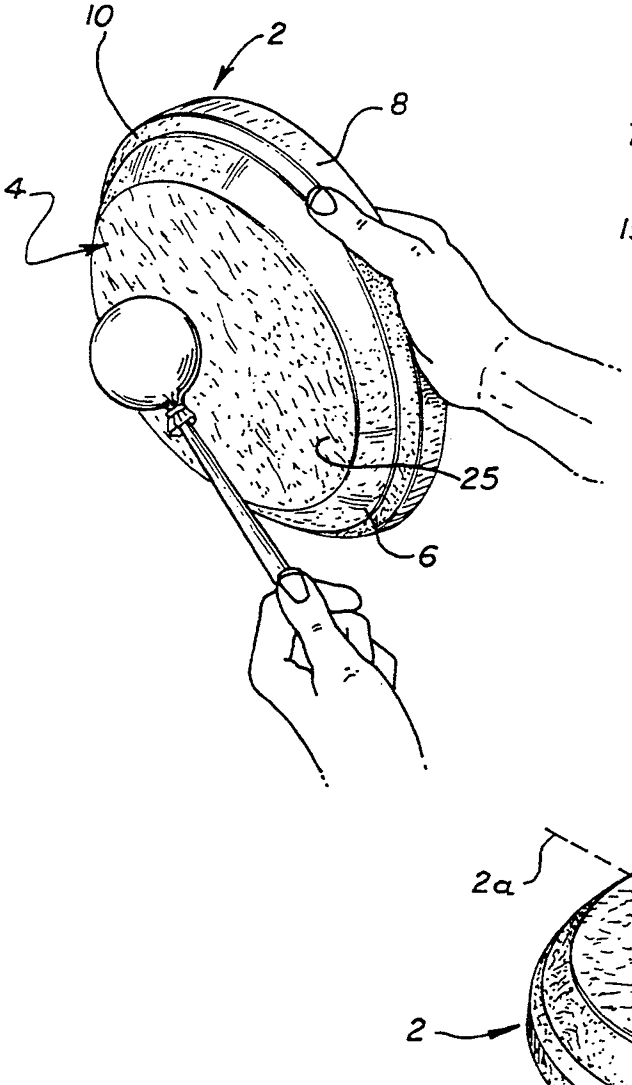
FIG. 5 is a perspective view of the single headed drum embodiment of the present invention shown being held and played by a drummer.
Figure 6:
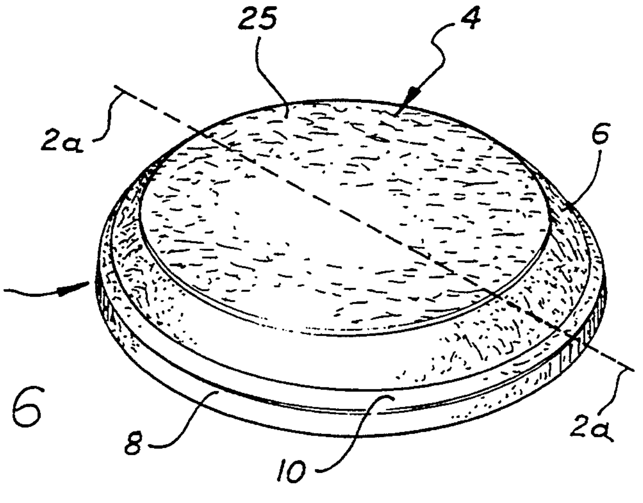
FIG. 6 is a perspective view of the drumhead of the present invention.

Because of its versatility, head 2 is adaptable for use with a conga drum shell, a bongo drum shell and a standard drum shell. Head 2 also can be played independently of a drum shell as a hand held single-headed drum. An example of the latter is demonstrated in FIG. 5, where the player is shown holding the head 2 by grasping the shoulder 8 in the palm of one of his hands and the seat 10 by the thumb. The surface 4 is then struck with the drum stick held in the player's other hand.

The present invention comprising the method of manufacture a drumhead includes forming the drumhead 2 by combining several layers of laminations 20 made typically of synthetic materials, such as Mylar ®, to achieve the thickness necessary to obtain the desired tonality. The laminations 20 are usually covered by a protective and resilient substance 22, such as Reemay ®. The laminations 20 are then cut in a circular shape. Individual strips 9 of approximately two inches in length and one-third of an inch in width are formed along the periphery 24 of the layers of laminations 20 and small openings 9*a* are formed at the end of each strip 9. The strips 9 are bent in a downward direction at the bearing edge 5 of the drum head 2. The orientation of the bent strips 9 is generally oblique relative to the horizontal plane 2*a* of the drum head 2. The strips 9 are cut and then bent to achieve a particular shape and height. Thus, a larger drumshell will usually require a taller head with a larger overall diameter. This is achieved, in part, by cutting the strips 9 in longer lengths and bending them to the requisite angle.

When the head is formed to this point, the ends 9*b* of the strips 9 are placed in a die 26 having a die cavity 28. A hoop-like shank 13 made of metal or some other suitably hard material is placed inside the die cavity 28 in close physical proximity to the strips 9 and the corresponding openings 9*a* formed at the end of each such strip.

A liquid resin 15 is then introduced into the die cavity 28 through an injection tube 29 and completely envelops a section of the strips 9 situated along the bottom periphery 7, the openings 9*a* and the shank 13. The resin 15 then hardens to form an annular shoulder 8 around the entire bottom periphery 7 of the drumhead 2. The annular shoulder 8 is employed, in part, to support the counter-hoop 18.

A synthetic substance 23, such as spunbonded polyester or Reemay ®, may be applied to the peripheral sidewall 6 in varying thicknesses to achieve a desired textured effect for aesthetic purposes. A soft epoxy substance 25 may also be applied to the striking surface 4 to form a textured surface. This enables the musician a degree of resistance to his fingers as they are moved across the textured surface to produce a variety of desired sounds.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. A drumhead for use in conjunction with a drum shell wherein an annular hoop is employed in stressed relation with said drumhead for use in attaching and fixedly securing said drumhead to said drum shell and tensioning the drumhead to an appropriate tonality, comprising:

a material for constituting a drumming surface, a peripheral wall member, said peripheral wall member being integrally formed circumferentially with said drumming surface and adapted to be bent downwardly with an orientation generally oblique relative to the horizontal plane of said drumming surface and having a plurality of individual strips separated by slits with each of said strips having a first end portion and an opening formed at or near said first end portion, a first means cured from a liquid to a rigid state comprising in said rigid state an annular shoulder disposed circumferentially and generally in abutting seal-tight relation against said peripheral wall member, said annular shoulder including means integrally formed therewith for fixedly anchoring said shoulder to said peripheral wall member to enable said shoulder to withstand the stress forces resulting from the tensioned engagement with said annular hoop, and a hoop-like shank adapted to be set within said first means cured from a liquid to a rigid state and disposed circumferentially about said peripheral wall member.

2. The invention of claim 1 wherein said means integrally formed with said annular shoulder for fixedly anchoring said shoulder to said peripheral wall member comprise a second means cured from a liquid to a rigid state flowing from said first means cured from a liquid to a rigid state for engaging and filling each of the spaced openings and the slits separating each of said strips and enveloping the first end portion of each of said strips.

3. The invention of claim 2 wherein said first and second means cured from a liquid to a rigid state comprise polyurethane.

4. The invention of claim 2 wherein said first and second means cured from a liquid to a rigid state comprise a resin material.

5. The invention of claim 1 wherein said hoop-like shank is comprised of metal.

6. The invention of claim 1 wherein said hoop-like shank is comprised of plastic.

7. A drumhead to be held by hand and played independently of a drum shell comprising, a material for constituting a drumming surface, a peripheral wall member, said peripheral wall member being integrally formed circumferentially of said drumming surface and adapted to be bent downwardly with an orientation generally oblique relative to the horizontal plane of said drumming surface and having a plurality of individual strips separated by slits with each of said strips having a first end portion and an opening formed at or near said first end portion, a first means cured from a liquid to a rigid state comprising in said rigid state an annular shoulder protruding outwardly from said peripheral wall member and disposed circumferentially and in abutting seal-tight relation against said peripheral wall member, said annular shoulder including means integrally formed therewith for fixedly anchoring said annular shoulder to said peripheral wall member, said means having a horizontally extending top surface comprising an annular seat to engage and be held by a player's hand, and a hoop-like shank adapted to be set within said first means cured from a liquid to a rigid state and disposed circumferentially about said peripheral wall member.

8. The invention of claim 7 wherein said means integrally formed with said annular shoulder for fixedly anchoring said shoulder to said peripheral wall member comprise a second means cured from a liquid to a rigid state flowing from said first means cured from a liquid to a rigid state for engaging and filling each of the spaced openings and the slits separating each of said strips and enveloping the first end portion of each of said strips.

9. A method of manufacture of a drumhead comprising the steps of:

a. Combining a plurality of materials to obtain a first layer of laminated materials having a desired thickness,
b. Laminating a second layer of material over the first layer of laminated materials to form a protective covering thereon, said second layer of material and said first layer of laminated materials combining to comprise a drumming surface,
c. Forming a generally circular shape cut-out member from said drumming surface, said cut-out member having a horizontal plane,
d. Forming a plurality of openings along the periphery of said circular shape cut-out member,
e. Forming a plurality of strips along the periphery of said circular shape cut-out member to correspond to each of said openings,
f. Bending said strips in a direction generally oblique relative to the horizontal plane of said cut-out member,
g. Placing said strips in an annular die mold having a die cavity,
h. Placing a hoop inside the die cavity in close physical proximity to the strips and the openings formed therein,
i. Introducing a means cured from a liquid to a rigid state into the die cavity for enveloping a portion of the strips and completely enveloping the openings and the hoop, and
j. Allowing said means cured from a liquid to a rigid state to hardened.

10. The method of manufacture of claim 9 including the step of applying a first synthetic material to said peripheral wall member in one or more layers to achieve a desired textured effect.

11. The method of manufacture of claim 10 including the step of applying a second synthetic material to said drumming surface to provide a finish layer and a textured surface thereon to enable the musician the resistance to his fingers as they are moved across the textured surface to produce a variety of desired sounds.

12. The method of manufacture of claim 9 wherein said first synthetic material comprises spunbonded polyester.

13. The method of manufacture of claim 11 wherein said second synthetic material comprises an epoxy compound.

14. The method of manufacture of claim 9 wherein said hood is comprised of metal.

* * * * *